United States Patent [19]

King et al.

[11] 4,235,066
[45] Nov. 25, 1980

[54] NUCLEAR FUEL ROD LOADING APPARATUS

[75] Inventors: Harold B. King, Wrightsville Beach; Robert MacIvergan; Gerald W. McKenzie, both of Wilmington, all of N.C.

[73] Assignee: General Electric Company, San Jose, Calif.

[21] Appl. No.: 910,999

[22] Filed: May 30, 1978

[51] Int. Cl.² ............... B65B 57/06; B65B 57/14; B65B 5/10

[52] U.S. Cl. ............... 53/500; 53/502; 53/505; 53/167; 53/532; 53/252; 53/253; 29/723

[58] Field of Search ............ 53/495, 498, 500, 502, 53/505, 532, 244, 252, 253, 167

[56] References Cited

U.S. PATENT DOCUMENTS

| | | | |
|---|---|---|---|
| 1,131,489 | 3/1915 | Dowd et al. | 214/510 |
| 2,092,786 | 9/1937 | Taylor | 53/253 X |
| 2,829,478 | 4/1958 | Engleson | 53/252 X |
| 3,735,550 | 5/1973 | Moore et al. | 53/432 |
| 3,746,190 | 7/1973 | Hotz | 214/34 |
| 3,907,123 | 9/1975 | Howell | 53/531 |
| 3,925,965 | 12/1975 | Rushworth | 53/167 |
| 3,940,908 | 3/1976 | Dazen et al. | 53/497 |
| 3,955,692 | 5/1976 | Cody et al. | 214/18 N |
| 3,965,648 | 6/1976 | Tedesco | 53/525 |

*Primary Examiner*—Travis S. McGehee

*Attorney, Agent, or Firm*—Ivor J. James, Jr.; Raymond G. Simkins; Samuel E. Turner

[57] ABSTRACT

An apparatus incorporating a microprocessor control is provided for automatically loading nuclear fuel pellets into fuel rods commonly used in nuclear reactor cores. The apparatus comprises a split "V" trough for assembling segments of fuel pellets in rows and a shuttle to receive the fuel pellets from the split "V" trough when the two sides of the split "V" trough are opened. The pellets are weighed while in the shuttle, and the shuttle then moves the pellets into alignment with a fuel rod. A guide bushing is provided to assist the transfer of the pellets into the fuel rod. A rod carousel which holds a plurality of fuel rods presents the proper rod to the guide bushing at the appropriate stage in the loading sequence. The bushing advances to engage the fuel rod, and the shuttle advances to engage the guide bushing. The pellets are then loaded into the fuel rod by a motor operated push rod. The guide bushing includes a photocell utilized in conjunction with the push rod to measure the length of the row of fuel pellets inserted in the fuel rod. Safeguards are employed to insure that the weight and position of the fuel pellets within the fuel rod fall within certain prescribed limits. After a segment of fuel pellets has been loaded, the guide bushing disengages the fuel rod, the rod carousel transfers a new rod into position, and the entire loading operation is repeated.

24 Claims, 13 Drawing Figures

NUCLEAR FUEL ROD LOADING APPARATUS

BACKGROUND OF THE INVENTION

1. Field of the Invention

This invention relates to nuclear fuel rod loaders which load nuclear fuel pellets into fuel rods used in nuclear reactor cores.

2. Description of the Prior Art

The core of a nuclear reactor contains an assembly of fuel rods, arranged so as to generate controlled amounts of heat in specific regions of the reactor core. The fuel rods, approximately twelve feet in length, each contain a column of nuclear fuel pellets extending nearly the full length of the rods. Some of the columns of pellets are organized and arranged in segments, each segment containing different types of fuel pellets varying in quantity of uranium enrichment.

It is critical to the operation of the reactor that these segments of fuel pellets contain the correct type of uranium fuel, that the segments are the correct length and that the segments are situated in the correct longitudinal region of the fuel rods. These factors are critical because the amount of heat generated in specific regions of the reactor core must be controlled to prevent any possibility of overheating. Additionally, nuclear engineers require certain types of fuel in certain longitudinal regions of the fuel rods in order to control the reaction and assist reactor shutdown. Thus, it is important that errors in loading or mixing of the different types of fuel pellets do not occur when the fuel pellets are loaded into the fuel rods.

Experience has shown that previous control methods do not provide the optimum level of accuracy desirable in the nuclear industry for assemblage of nuclear fuel rods. Assembly processes and assembly equipment are desirable which fully insure the degree of quality control required for a reliable system of fuel rod assembly.

In many currently used systems, fuel pellets and fuel rods are assembled and organized on tables, stands and holders with the assembled row of fuel pellets being manually propelled into the fuel rod. These systems have been modified with the use of various types of guide bushings developed to assist the operator in aligning assembled rows of fuel pellets with the center line of the fuel rod so as to facilitate a smooth and damage-free transfer of the pellets into the fuel rod. However, these systems still involve the risk of human failure on the part of the operator and therefore may require multiple checks by other individuals to insure accurate assembly.

U.S. Pat. Nos. 3,940,908 and 3,965,648 disclose improvements over the prior art systems in that preassembled rows of fuel pellets are transferred by mechanical fingers or vibrators into multiple fuel rods. These patents, however, primarily represent an improvement of only one step in the loading operation. The rods themselves must still be placed by hand in the loading position. No provision has been made to automatically weigh the fuel pellets or to measure the length of the fuel pellets as they are loaded into the fuel rods. No automatic safety controls are included in the loading sequence.

It is therefore an object of the present invention to provide an apparatus to assemble a plurality of nuclear fuel pellets in segments, each segment containing a specific type of nuclear fuel, and load the segments into a plurality of fuel rods so that the segments are contained in the correct longitudinal region of the fuel rods, and each segment contains the correct type and amount of fuel.

Another object of the present invention is to provide an apparatus for facilitating assembly of a plurality of nuclear fuel pellets in a row, positioning the row of fuel pellets and the fuel rod in a communicating relationship with each other, transferring the pellets into the fuel rod through a guide bushing and disengaging the guide bushing from the loaded fuel rod.

Another object of the invention is to provide an apparatus which automatically indexes the fuel rods, transfers the proper rod into communicating relationship with the row of fuel pellets at the proper stage in the loading sequence, and moves to index another rod into position after loading of the previous rod has been completed.

Another object of the invention is to provide an apparatus which automatically measures and records the weight and length of the row of pellets currently being loaded and the length of the row of fuel pellets in the final segment which must be loaded into the fuel rod.

Another object of the invention is to provide an apparatus which automatically imposes safety controls on the operation and which interrupts the loading sequence if the assembled length of the row of fuel pellets within the loaded fuel rod, or the weight of the pellets does not fall within certain prescribed limits.

SUMMARY OF THE INVENTION

A nuclear fuel rod loading apparatus is provided which automatically loads nuclear fuel pellets into fuel rods with a minimum of manual effort in a manner and sequence to assure the quality control required in the nuclear industry. The apparatus comprises a split "V" trough, upon which a segment of pellets of a predetermined type of nuclear fuel and of a predetermined length, is assembled in a row. A light on a length control board mounted above the split "V" trough and a digital readout on a control panel indicate to the operator what length is called for and physically designate where the end point of the assembled row should be. After the correct length has been assembled, the two sides of the split "V" trough are opened to allow the pellets to drop into a shuttle. The shuttle is moved into a position which allows the pellets to be weighed; the weight is recorded, and the shuttle is then moved to bring the row of pellets into alignment with a guide bushing and a push rod. The push rod is powered with a motor-operated rotating screw, controlled to apply the proper force and speed from a position behind the row of pellets, so as to advance the pellets along the length of the shuttle and into the guide bushing.

On the opposite side of the guide bushing, the fuel rods are positioned by a rod indexer controlling a carousel which automatically transfers the appropriate rod into an aligned relationship with the guide bushing. Prior to loading the fuel pellets, the guide bushing is moved to engage the fuel rod and the shuttle is moved to engage the guide bushing.

As the pellets are advanced by the push rod through the guide bushing, a lighr source and photocell detect the beginning and the end of the row of fuel pellets. An encoder connected to the rotating screw emits a fixed number of electrical pulses for each revolution of the rotating screw, which directly corresponds to the length traversed by the push rod. A microprocessor in communication with the photocell and the encoder counts the number of pulses occurring between the beginning and the end of the passage of fuel pellets, and the microprocessor calculates the length of the row of pellets.

Further, the encoder and photocell and used in conjunction with the push rod to determine the length of the space remaining in the fuel rod which is unoccupied by fuel pellets. With this information the microprocessor calculates the correct length of fuel pellets which must be assembled in the last segment to insure that the correct total length of fuel pellets will be inserted in the fuel rod and displays that information on a digital readout on the control panel.

After the pellets are loaded, the shuttle is disengaged from the guide bushing; the guide bushing is disengaged from the fuel rod, and the rod indexer transfers another rod into alignment with the guide bushing. The entire loading sequence is repeated until all the rods held by the rod indexer have been loaded.

In the preferred sequence of assembly, a first type of fuel is made available to the operator alongside the split "V" trough, and that specific type of fuel is loaded in the proper segment length in all of the rods mounted on the rod carousel. The first type of fuel is then removed; a second type of fuel is made available to the operator, and all the rods on the rod carousel are loaded with the second type of fuel. This process is repeated until all of the rods are completely loaded with all of the desired segments throughout their entire length. This procedure, in which the operator has access to only one type of fuel pellet at any given moment, minimizes the possibility of the operator loading an improper type of fuel pellet into a particular fuel segment.

BRIEF DESCRIPTION OF THE DRAWINGS

While the specification concludes with the claims particularly pointing out and distinctly claiming the subject matter of the invention, it is believed the invention will be better understood from the following description taken in conjunction with the accompanying drawings, wherein:

Figures 1, 10:
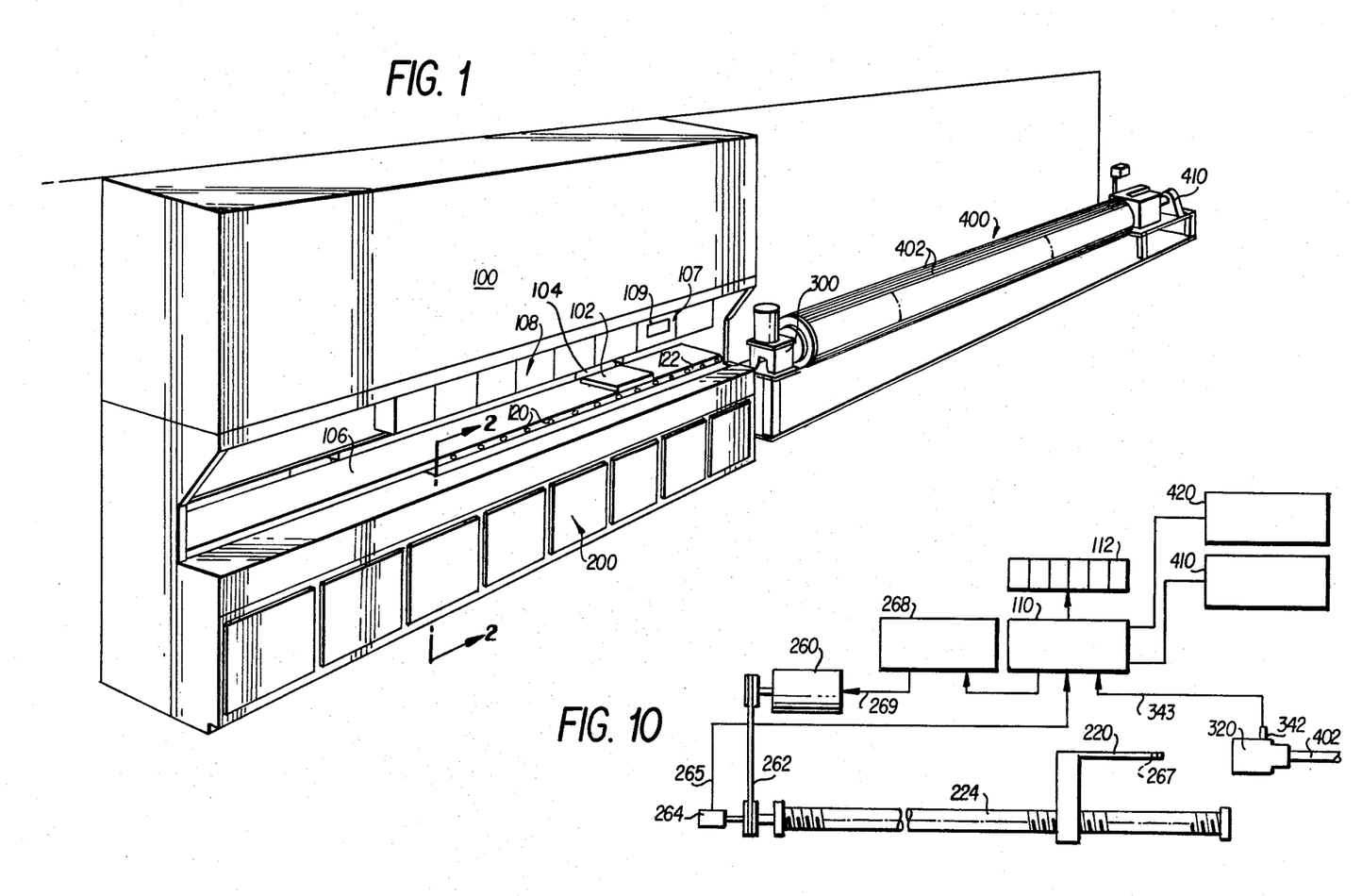
FIG. 1 is an isometric view showing the fuel rod loading apparatus of this invention and a number of fuel rods.
FIG. 10 is a block diagram of the push rod mechanism, a fuel pellet row length measuring apparatus, and a final segment length determining apparatus employed in the fuel rod loading apparatus of this invention.

Referring now to the drawings, wherein like reference characters designate like or corresponding parts throughout the several views, there is shown in FIG. 1, a nuclear fuel rod loading apparatus designed to automatically load fuel pellets into fuel rods of the type used in nuclear reactor cores. The apparatus basically comprises four major sections: an apparatus control 100, a main cabinet 200, a guide bushing assembly 300, and a fuel rod indexer, which, in the specific embodiment of this invention, is a carousel 400.

For greater ease of understanding the apparatus, a summary description of the major sections, the components comprising each section and their relationship will be first set forth. Thereafter, a detailed description of individual components will be given. Finally, the operation of the apparatus in performing the loading operation will be described.

SUMMARY DESCRIPTION OF THE COMPONENTS

The operations generally begin in the area of the apparatus control 100 shown in FIG. 1. The fuel pellets are delivered from behind the apparatus control on a tray 102 by a conveyor system along the worktable 106. To assist in preventing the machine operator from improperly loading an incorrect type of fuel pellet into a fuel rod, each individual tray contains fuel pellets of only one type. From the worktable, the fuel pellets are transferred through the main cabinet 200, the guide bushing assembly 300 and into fuel rods 402 mounted in a circular fashion about the rod carousel 400. The operator monitors the operations of the apparatus from a control panel 108. A microprocessor contained inside the apparatus control generally directs the sequence of operations occurring inside the fuel pellet loading apparatus.

Figure 2:
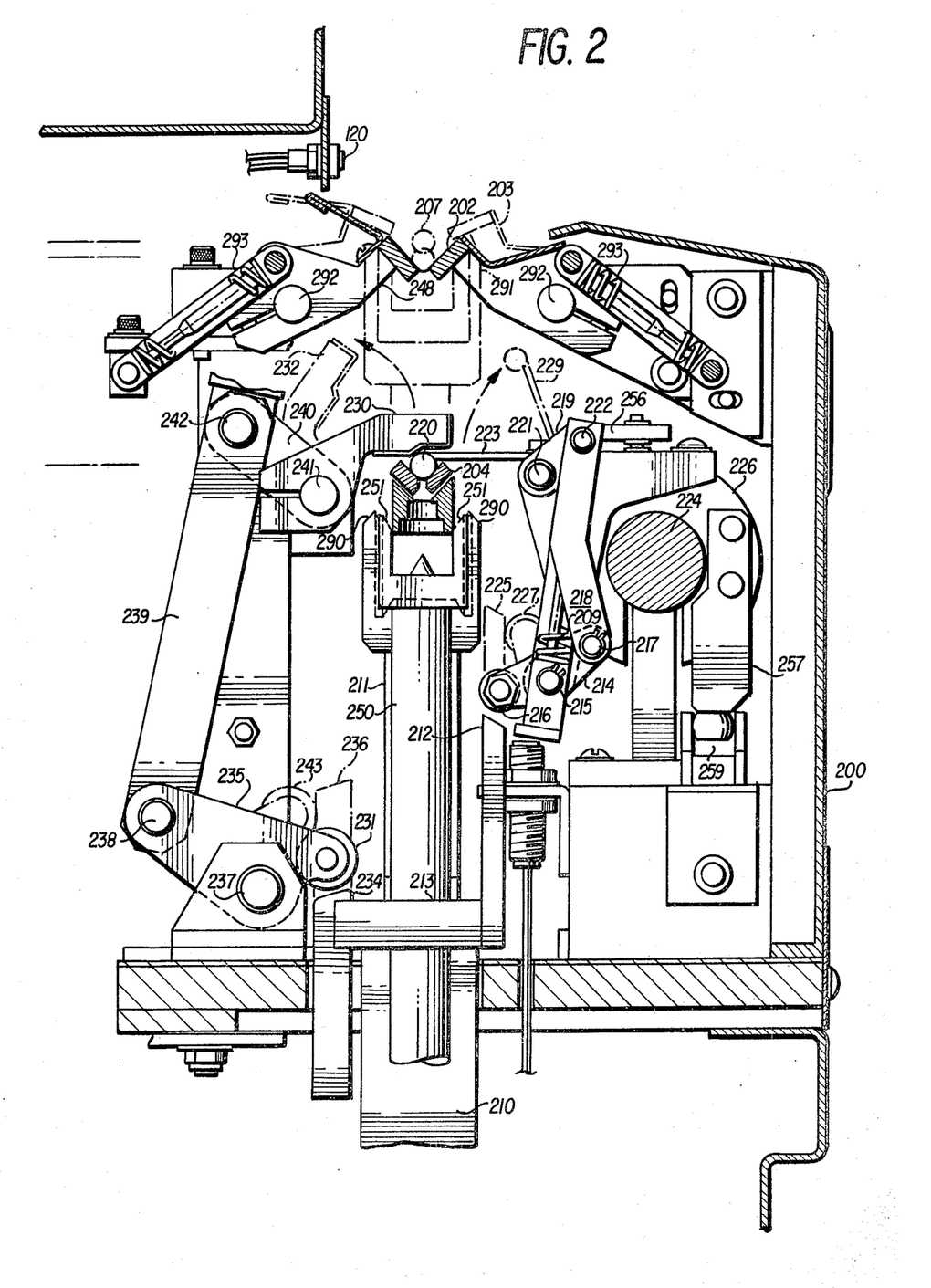
FIG. 2 is an enlarged sectional view generally taken on line 2—2 of FIG. 1 showing the interior of a cabinet containing a means of transferring the fuel pellets into a loading position in alignment with a fuel rod.

Referring now to FIG. 2, the machine includes an elongated member, which in the embodiment shown is a split "V" trough 202, for receiving a row of fuel pellets, the desired number of pellets being taken from the tray 102 and assembled by the operator in the split "V" trough 202. A shuttle 204 is provided for the purpose of physically transferring the fuel pellets from the assembly position to a fuel rod loading position.

Mechanism is provided for moving the shuttle 204 and shuttle supports 211 from the position shown in solid lines in FIG. 2 vertically to a position directly beneath the split "V" trough. Further, mechanism is provided for then moving the two halves of the split "V" trough to the open position shown by dashed lines in FIG. 2, thereby causing the fuel pellets to fall by gravity into the shuttle.

Figure 3:
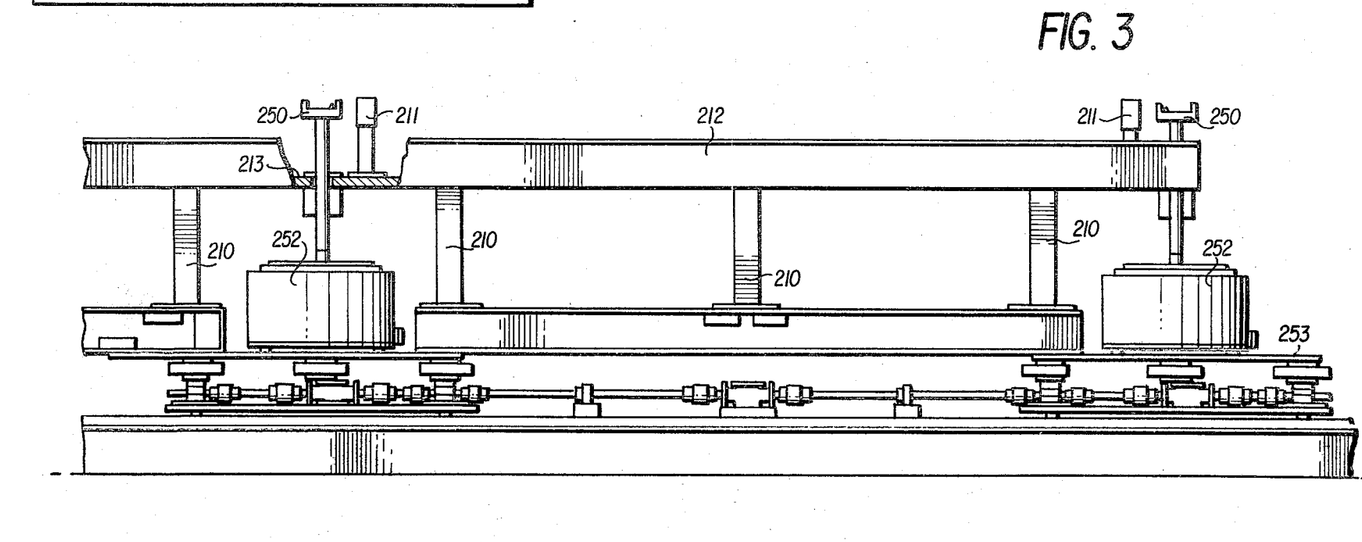
FIG. 3 is an enlarged elevation view of a fuel pellet weighing device and a shuttle transfer device contained in the cabinet as seen from the front of the cabinet shown in FIG. 1.

Referring now to FIGS. 2 and 3, scale posts 250 are provided for the purpose of engaging the shuttle and raising the shuttle above the shuttle supports, until the pellets arrive at a position shown by the dashed outline 207. At this time the shuttle is supported entirely by the scale posts and is therefore free of any forces which could be exerted by various other mechanisms associated with the shuttle parts. The shuttle and the fuel pellets alone are then weighed by the scales 252. After the weighing has been completed, the shuttle is returned to its lower position as shown by solid lines in FIG. 2.

Referring again to FIG. 2, a push rod 220 is provided for the purpose of pushing the fuel pellets along the trough of the shuttle and into the fuel rod. A cover 230 is provided to occupy a position directly above and adjacent the shuttle so as to provide an enclosed trough for the fuel pellets to prevent the pellets from binding, rising up and falling out of the shuttle when they are pushed along the shuttle.

Figures 4, 5:
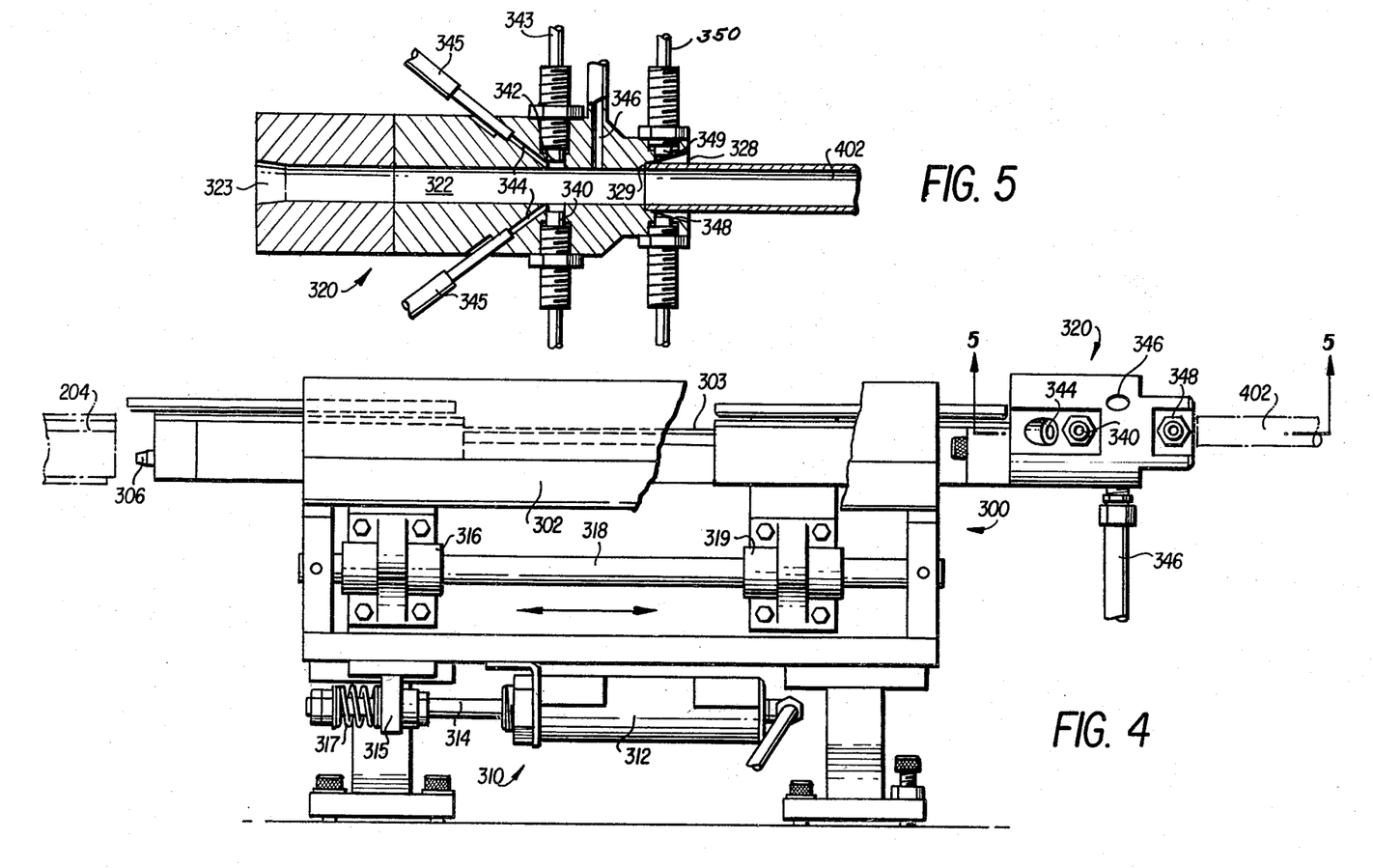
FIG. 4 is an elevation view of a guide bushing assembly, the end of the shuttle and an end of a fuel rod all employed in the fuel rod loading apparatus of this invention.
FIG. 5 is an enlarged sectional view of a guide bushing generally taken along line 5—5 of FIG. 4.

Referring now to FIGS. 4 and 5, a guide bushing assembly 300, which includes a guide bushing 230 and a guide bushing forebody 302, is provided to facilitate transfer of fuel pellets between the shuttle and the fuel rods 402. A guide bushing assembly actuator 310 is mounted below the guide bushing forebody 302 for moving the guide bushing assembly in a longitudinal direction so as to engage the end of the fuel rod.

Figure 6:
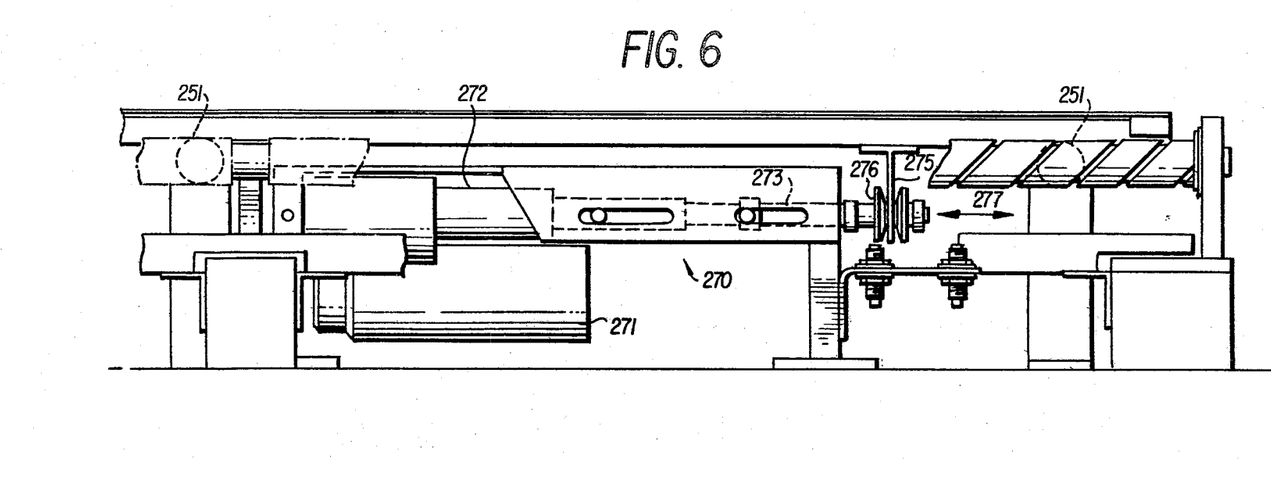
FIG. 6 is an elevation view of the shuttle and a shuttle actuator employed in the fuel rod loading apparatus of this invention.
Figure 7:
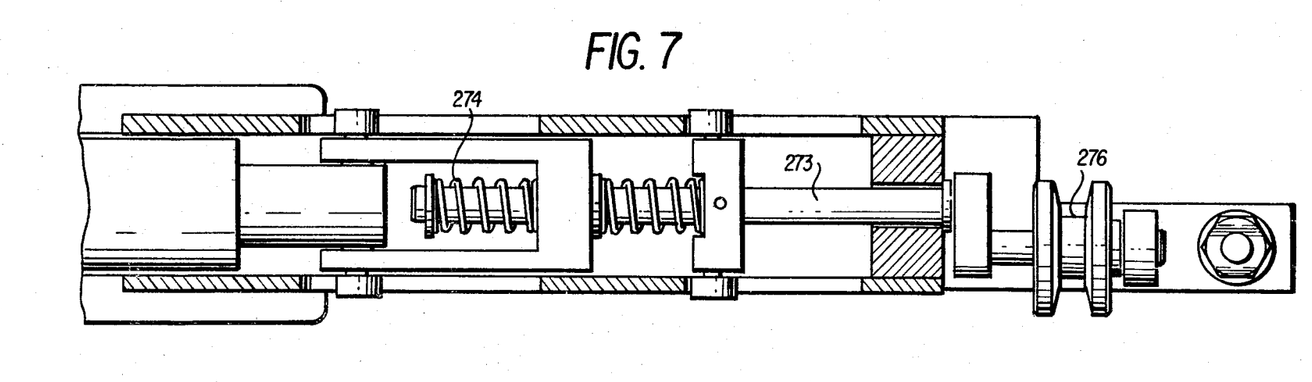
FIG. 7 is an enlarged partially sectional view of the shuttle actuator as seen from the top of the shuttle actuator.

Referring now to FIGS. 6 and 7, a shuttle actuator 270 is mounted below the shuttle for moving the shuttle longitudinally. The apparatus is arranged so that when the guide bushing assembly is in engagement with the fuel rod, the shuttle actuator moves the shuttle into engagement with the guide bushing assembly.

Figures 8, 9:
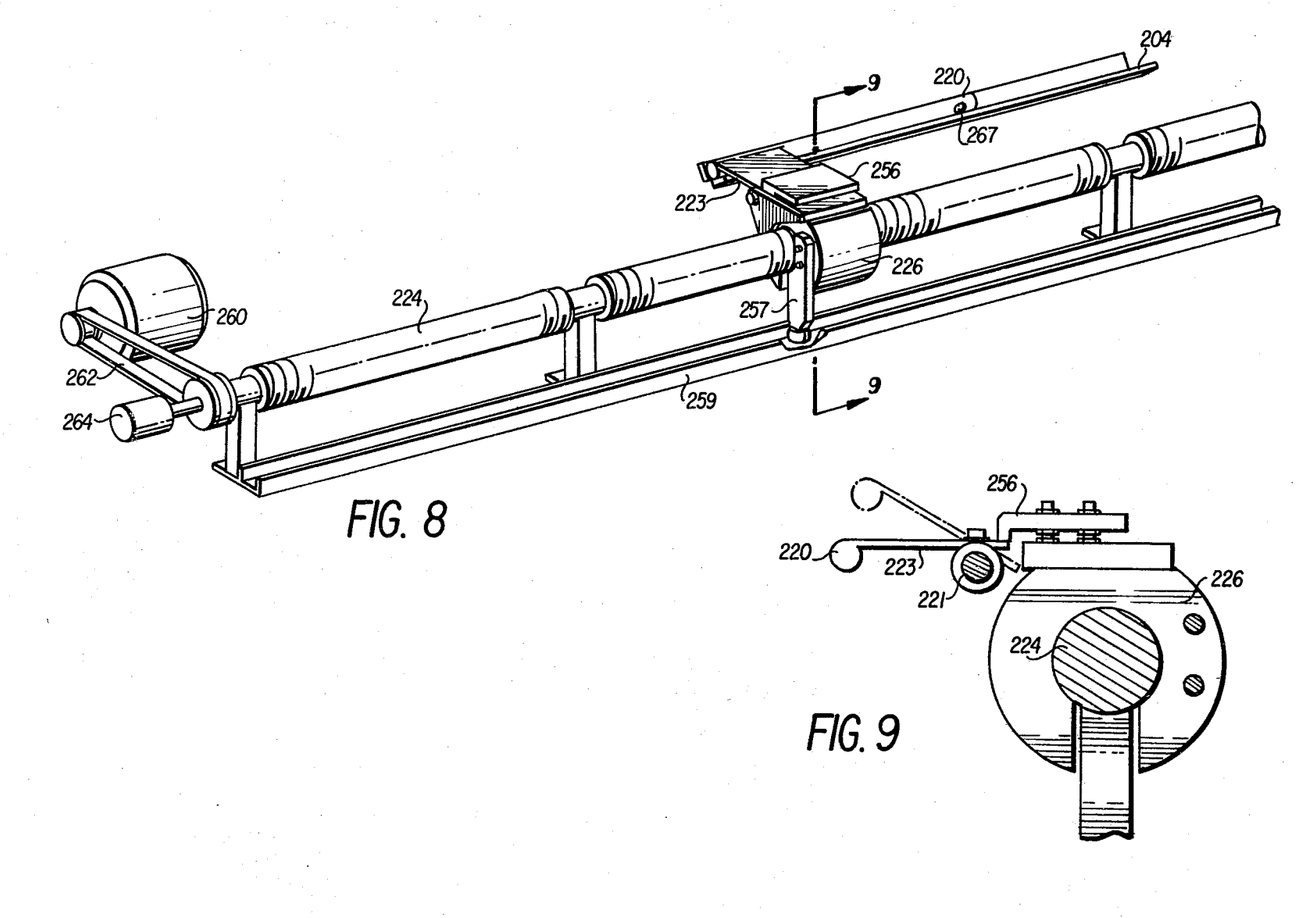
FIG. 8 is an isometric view of a rotatable screw and push rod mechanism employed in the fuel rod loading apparatus of this invention.
FIG. 9 is an enlarged sectional view of the push rod mechanism taken along line 9—9 of FIG. 8.

Referring now to FIGS. 8 and 9, the arrangement for moving the push rod to advance the pellets is shown. This arrangement includes a screw 224 in threaded relation with a nut 226. The nut 226 is connected by an arm 223 to the push rod. Rotation of the screw 224 effects longitudinal movement of the nut 226 and the push rod. The movement of the push rod causes the fuel pellets to be transferred from the shuttle to the fuel rod through a trough 303 (see FIGS. 4 and 5) in the guide bushing forebody and a passageway 322 (see FIG. 5) in the guide bushing.

Figure 11:
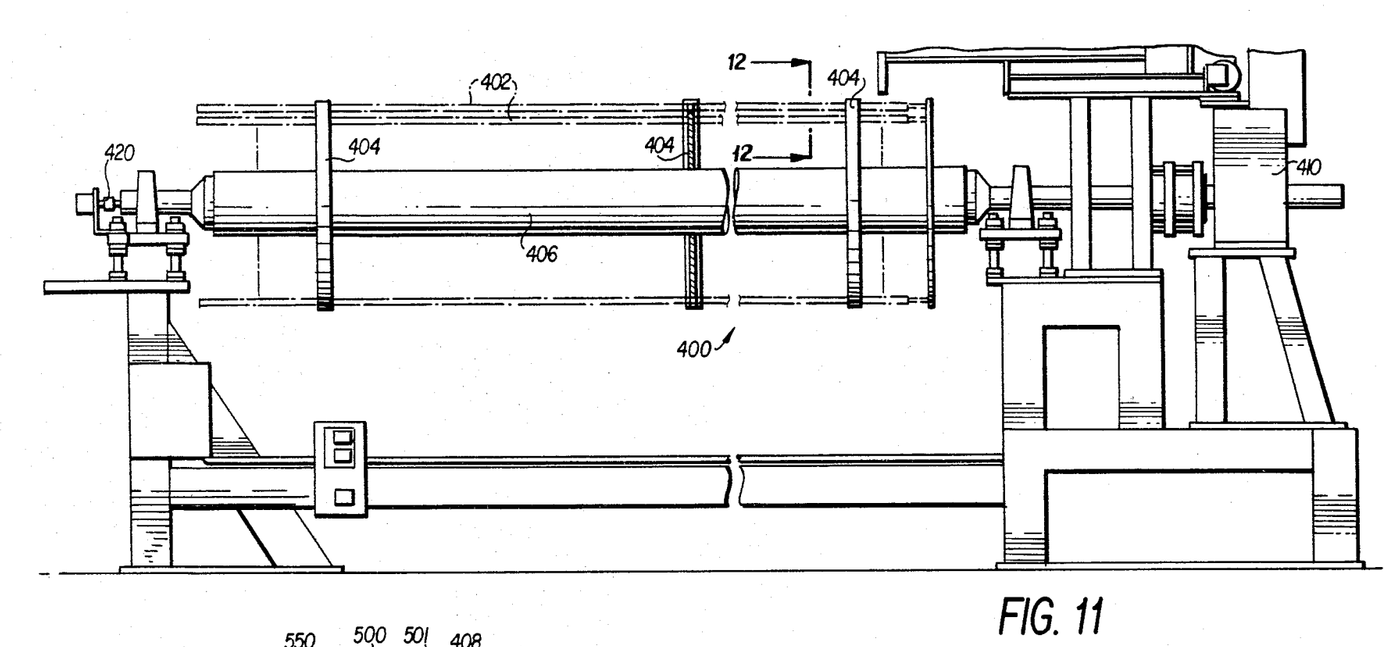
FIG. 11 is an elevation view of a rod carousel and rod indexer employed in the fuel rod loading apparatus of this invention.
Figure 12:
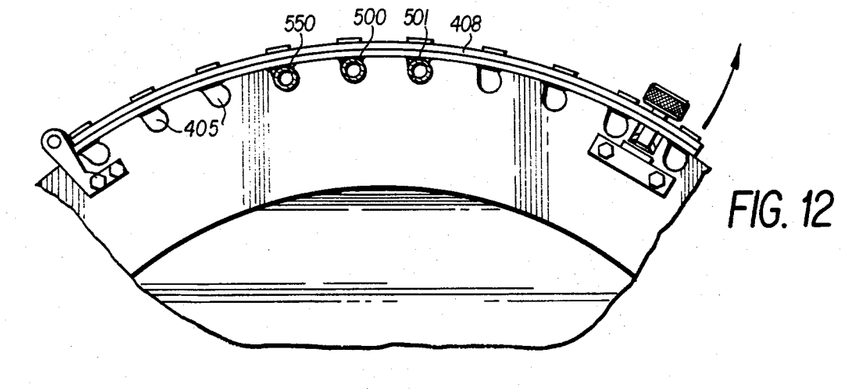
FIG. 12 is an enlarged view, partly in section and partly broken away, of a portion of the rod carousel taken generally on line 12—12 in FIG. 11.

Referring to FIGS. 11 and 12, the fuel rod carousel 400, containing a plurality of fuel rods 402 mounted around the circumference of the fuel rod carousel, is provided for positioning fuel rods sequentially in line with the passageway 322 in the guide bushing 320. A carousel drive 410 is provided for rotating the rod carousel after a given segment of fuel pellets has been loaded into a first fuel rod. The carousel is rotated a sufficient amount to position the next fuel rod in alignment with the passageway in the guide bushing. The loading process is then repeated for each successive fuel rod.

DETAILED DESCRIPTION OF INDIVIDUAL COMPONENTS

Individual components of the nuclear fuel pellet loading apparatus, referred to previously, will now be discussed in greater detail.

The area in which the operator monitors and controls the fuel pellet loading operation, as shown in FIG. 1, generally includes the control panel 108 and the worktable 106 mounted over the main cabinet 200. A conveyor system extends the full length of the worktable and is provided for the purpose of depositing trays 102 onto the worktable in a position in which they are accessible to the operator. The operator manually removes the fuel pellets from the fuel trays and deposits the pellets in the split "V" trough 202 (shown in FIG. 2) positioned near the front of the worktable. A plurality of lights 120 are provided at the front of the worktable for indicating to the operator the approximate length of the segment of fuel pellets to be assembled in the trough 202 according to a rod design plan. A microprocessor is provided to control the loading operations, and this microprocessor accomplishes several functions including illumination of the correct one of the lights 120. The operator assembles the pellets in a row, starting from the extreme righthand edge of the split "V" trough 202 and continuing to a lefthand end point generally indicated by the particular illuminated light. Exact length indications are provided by a length scale 122 which further includes arrows marking segment length end points and adjacent marks indicating plus or minus one-quarter inch tolerances. The control panel 108 contains the controls from which the operator can monitor the operations of the fuel pellet loading apparatus, and the precise length of the segment required for the particular loading operation is displayed on a screen 109 associated with a section 107 of the control panel.

The details of the microprocessor referred to above do not form any part of this invention and the microprocessor may be of any suitable type for directing the proper sequence of operations. In a specific embodiment of this invention an EPTAK microprocessor sold by the Eagle Signal Industrial Controls Division of the Gulf & Western Manufacturing Company is employed.

Referring now to FIGS. 2 and 3, a plurality of vertically movable longitudinally-spaced shuttle posts 210 are provided for supporting and effecting vertical movement of the shuttle 204. More specifically, a support table 213 is mounted on the shuttle posts 210. Two vertically extending shuttle supports 211 are mounted in longitudinally-spaced relationship on the table 213, each shuttle support being formed at its upper end to receive and support the shuttle.

When the shuttle is in its lower position, wherein the shuttle is aligned with the passageway 322 in the guide bushing 320, that is, the position shown in solid lines in FIG. 2, the shuttle rests on shuttle rollers 251 (see FIG. 6), the push rod 220 is positioned in the trough of the shuttle, and the cover 230 is positioned over the shuttle. In order to permit the fuel pellets to be transferred from the split "V" trough into the shuttle, mechanism is provided for raising the shuttle to a position below the split "V" trough, and, in the process, for pivoting the push rod and the cover away from the shuttle to the position shown by the dashed lines in FIG. 2. This mechanism includes a push rod cam 212, which is mounted on one side of the support table 213 and extends upwardly therefrom, and a cover cam 234, which is mounted on the opposite side of the support table.

Interposed between the cover cam 234 and the cover 230 is a mechanism for effecting opening of the cover as the shuttle posts 210 and the cam 234 move upwardly. This mechanism includes a lever 235 mounted for pivoting movement on a shaft 237. A roller 231 is mounted at one end of the lever 235 in the path of the cover cam 234. The opposite end of the lever is connected by a pin 238 to an upwardly extending arm 239. A bellcrank lever 240 is mounted for pivoting movement about a pin 241. One leg of the bellcrank lever includes the cover cam 230. The other leg is connected by a pin 242 to the arm 239. It can be seen from FIG. 2 that as the cam 234 moves upwardly to the dashed line position shown at 236, the cam engages the roller 231 and causes counterclockwise movement, as viewed in FIG. 2, of the lever 235 to the dashed line position shown at 243. This, in turn, effects downward movement of the arm 239 and thereby effects counterclockwise pivoting of the bellcrank lever 240 to move the cover 230 to the dashed line position shown at 232, thereby moving the cover out of the line of movement of the shuttle 204 as the shuttle is moved vertically toward its uppermost position.

Similarly, a mechanism is interposed between the push rod cam 212 and the push rod 220 for moving the push rod in a clockwise direction, as viewed in FIG. 2, out of the vertical line of movement of the shuttle 204. This mechanism includes a lever 214 mounted for pivoting movement on a shaft 215. A roller 216 is mounted at one end of the lever 214 in the path of the push rod cam 212. The opposite end of the lever is connected by a pin 217 to an upwardly extending arm 218. An upper arm 219 is pivotally mounted on a pin 221. The arm 219 is connected to the upwardly extending arm 218 by a pin 222. A spring-loaded plunger 209 connects the pin 222 to the shaft 215, for biasing the push rod to the solid line position shown in FIG. 2. A push rod arm 223, on which the push rod 220 is mounted, is connected integrally with the upper arm 219 so as to move therewith. It can be seen from FIG. 2 that as the cam 212 moves upwardly with the table 213 to the dashed line position shown at 225, the cam 212 engages the roller 216 and causes clockwise movement of the lever 214 about the shaft 215 to the dashed line position indicated at 227. This, in turn, causes downward movement of the arm 218 which thereby causes clockwise pivoting of the upper arm 219 to move the push rod arm and the push rod to the dashed line position shown at 229 and compress the spring-loaded plunger 209. The push rod is thus moved out of the line of movement of the shuttle as the shuttle moves vertically to its uppermost position.

By reference to FIG. 2, it can be seen that in the lower position of the shuttle 204, the push rod 202 is positioned within the trough of the shuttle, and the cover is positioned over the push rod. In order to insure that the cover is first moved toward its open position and the push rod is moved after the cover toward its open position, the cams 212 and 234 are positioned so that the cam 234 contacts roller 238 to begin movement of the cover before the cam 212 engages roller 216 to begin movement of the push rod.

In order to effect transfer of fuel pellets from the split "V" trough 202 to the shuttle, provision is made for moving the two halves of the trough 202 to the open position indicated by dashed lines at 203 in FIG. 2. Specifically, the upper end of each of the shuttle supports 211 is formed to include upwardly extending split "V" cams 290 which are positioned to engage the two halves of the split "V" trough as the shuttle approaches its uppermost position, indicated by the dashed lines at 291. Each of the halves of the split "V" trough is mounted for pivoting movement about a pin 292 compressing springs 293. The springs are provided to return the two sides of the split "V" to the closed position. When the shuttle later begins its downward movement the split "V" cams disengage the two sides of the split "V" and the springs extend under tension so as to force the two sides together to the closed position illustrated by the solid lines in FIG. 2. When the shuttle approaches its lowest position, first the push rod cam and second the cover cam disengage their corresponding cam surfaces causing the push rod and then the cover to swing back into place over the shuttle as indicated by positions 220 and 230, respectively, shown in solid lines in FIG. 2.

Provision is made to weigh the row of fuel pellets after the row has been transferred from the split "V" trough to the shuttle. Referring to FIG. 3, the weighing arrangement includes two scales 252 mounted in longitudinally spaced relation on a platform 253, which platform also supports the shuttle posts 210. The scales 252 contain load cells but are illustrated only generally because the details thereof form no part of the present invention. It is contemplated that the scales may be of any suitable type; in one embodiment the scales employed are Model No. 3031 sold by Toledo Scales. A scale post 250 extends upwardly from each scale 252 through an opening in the support table 213 so as to be independent of the shuttle posts 210, the shuttle supports 211 and the elements mounted thereon. After the shuttle posts have reached their uppermost position and the split "V" is open, the scale posts continue to move upwardly, lifting the shuttle off the shuttle supports. The shuttle and the fuel pellets therein are then supported entirely on the scales independent of any other components of the apparatus. The weight sensed by the scales 252, therefore, is only that of the scale posts, the shuttle and the fuel pellets therein. The results of the electronic weight measurement are displayed to the operator on the control panel 108. If the weight is within predesignated parameters, the operation continues. If the weight is not within the predesignated parameters, the automatic operation is halted and a warning light on the control panel illuminates to indicate to the operator that the weight of the fuel pellets is not within the predesignated parameters.

The push rod is returned to its original position by the spring-loaded plunger 209. When the shuttle later returns to its lower position, the cam 212 disengages the roller 216. This allows the spring-loaded plunger 209 to extend, causing counterclockwise pivoting of the upper arm 219 moving the push rod arm and the push rod back to their original, lower positions.

Similarly, the cover 230 is returned to its original position by a spring-loaded plunger (not shown) when the cover cam 234 disengages the roller 231 allowing the lever 235 to pivot in a clockwise direction. This causes the arm 239 to move upwardly thereby effecting clockwise pivoting of the bellcrank lever 240 to move the cover 230 to its original position overlying the shuttle.

Referring now to FIGS. 4 and 5, the shuttle 204 is shown in its lower position in alignment with a trough 303 in a guide bushing forebody 302, the guide bushing passageway 322, and a fuel rod 402. In order to facilitate movement of the pellets from the shuttle to the fuel rod, a guide bushing actuator mechanism 310 is provided for moving the guide bushing into engagement with the fuel rod. A pneumatic cylinder 312 which may be of any conventional type provides the force to move the guide bushing assembly and is fixedly mounted below the guide bushing assembly. A cylinder rod 314 extends from the pneumatic cylinder. The cylinder rod is connected by coupling 315 to a sleeve 316 which is connected to the guide bushing forebody. The cylinder rod is biased to the left by a compression spring 317. The guide bushing assembly rod 318 is provided for supporting the guide bushing assembly for longitudinal movement. The sleeve 316 and a second sleeve 319, both of which are part of the guide bushing assembly, are arranged to slide on the rod 318. Actuation of the pneumatic cylinder 312 causes the cylinder rod 314 to move to the right against the bias of the spring 317 and thereby move the bushing assembly to the right along the rod 318 to bring the guide bushing 320 into engagement with the aligned fuel rod 402. Upon deactivation of the pneumatic cylinder 312 the guide bushing assembly, including the guide bushing, is returned by the spring 317 to its original position, shown in FIG. 4.

Referring now to FIGS. 6 and 7, a shuttle actuator mechanism 270 is provided for moving the shuttle longitudinally into engagement with the guide bushing assembly after the guide bushing has been brought into engagement with the fuel rod. The mechanism 270 includes an actuator 271 of any conventional type. In the embodiment shown, the actuator 271 comprises an electrically driven linear actuator which is connected to the shuttle to effect longitudinal movement thereof. A shuttle actuator arm 272 mounted above the shuttle actuator is moved longitudinally when the shuttle actuator is activated. The shuttle actuator arm is connected to a shuttle actuator rod 273 on the end of which is mounted a shuttle yoke guide 276. A shuttle yoke 275, which has a bifurcated lower end, is mounted on the bottom of the shuttle 204 and engages the shuttle yoke guide when the shuttle is in its lowest position, that is, the position shown in solid lines in FIG. 2. Activation of the shuttle actuator causes the shuttle yoke guide, and consequentially the shuttle, to move longitudinally to the right, along the line of the arrows 277 shown in FIG. 6, into engagement with the forebody 302 of the guide bushing assembly. A shuttle return spring 274 shown in FIG. 7 is mounted on the rod 273 in a position to be compressed during such rightward movement of the shuttle. The bias of the spring causes the shuttle to move longitudinally to the left when the shuttle actuator is no longer activated, causing the shuttle to return to its original position.

In order to properly guide the shuttle as it moves into engagement with the guide bushing forebody, tapered pins, one of which is shown at 306 in FIG. 4, are mounted on the guide bushing forebody and engage corresponding holes in the end of the shuttle. This insures proper alignment of the shuttle with the trough 303 in the guide bushing forebody.

Referring now to FIGS. 4 and 5, the guide bushing 320, forming the end portion of the guide bushing assembly, functions to guide the fuel pellets into the end opening in the fuel rod 402. The trough 303 is constructed so as to be in alignment with the passageway 322 in the guide bushing. The left end of the passageway 322 is formed in a funnel-shape, as shown at 323, to aid in guiding the pellets smoothly from the trough 303 into the passageway 322. The right end of the passageway 322 is also formed in a funnel-shape as shown at 328, to aid in guiding the fuel rod into the passageway 322. The sides of the opening are continuously tapered to a circular lip 329. The tapered sides serve to center the end of the fuel rod in the opening 328. This serves to align the centerline of the passageway with the centerline of the fuel rod to promote a smooth transition of fuel pellets into the fuel rod.

In order to check the accuracy of the length of the segment of fuel pellets being loaded into a fuel rod, a light source 340 and a light detector 342 are incorporated in the guide bushing on opposite sides of the passageway 322. As shown in FIG. 5, the light source 340 is positioned on one side of the passageway 322 and the light detector 342 is positioned on the opposite side of the passageway in the path of light from the source 340. When the fuel pellets or the push rod traverse that portion of the passageway directly opposite the light source, the light from the light source is blocked from the photocell. A signal representative of the condition of the photocell is transmitted through a line 343 for affecting operation of the apparatus in a manner to be described more fully later. The inventor has chosen to employ a light source and photocell for this purpose; however, other devices, such as a pneumatic switch, might also be employed.

To insure removal of dust developed in the guide bushing passageway 322 from the fuel pellets passing therethrough, provision is made for the introduction of helium or other inert gas into the passageway and the removal of the gas and dust therefrom. For this purpose two inclined openings 344 are provided through the walls of the guide bushing just preceding the light source and photocell, and tubes 345 are connected to these openings for directing helium into the passageway 322. Three vacuum outlets 346, arranged 120° apart about the circumference of the passageway, are provided for withdrawing from the passageway both the helium gas and any dust entrained in the gas.

It is important that the fuel pellets not be moved through the passageway until the guide bushing has moved into complete engagement with the fuel rod to provide a continuous path for the fuel pellets. To insure that such engagement has occurred before the fuel pellets are moved through the guide bushing, a second light source 348 is positioned in one side of the guide bushing near the exit end thereof, and a second photocell 349 is positioned on the opposite side of the passageway 322. When the guide bushing moves into engagement with the end of the fuel rod, the fuel rod enters a funnel-like opening 328 and abuts against a circular lip 329, interrupting the path from the light source 348 to the photocell 349. An electric signal indicative of light interruption is transmitted from the photocell over a line 350 to the microprocessor 110 which controls the operation of the push rod and the insertion of the fuel pellets.

Referring now to FIGS. 8, 9 and 10, the main cabinet and the apparatus control contain a suitable mechanism for advancing the push rod to move the fuel pellets from the shuttle through the guide bushing into the fuel rod, and for retracting the push rod after the pellets have been inserted. The screw 224 extends the entire length of the cabinet in a direction parallel to the shuttle 204. The nut 226 which supports the push rod 220 is mounted on the screw for longitudinal movement along the screw as the screw rotates. The push rod arm 223 and the push rod 220 are pivotally mounted on a pin 221. A bracket 256 is mounted on the nut 226 to provide an adjustable stop to the pivoting movement of the push rod. A motor 260 is connected to a belt 262 for rotating the screw 224. The nut 226 is prevented from rotating by a nut arm 257 engaging a channel 259 also extending the full length of the cabinet. Therefore, rotation of the screw causes the nut to move longitudinally along the axis of the screw and parallel to the shuttle 204. The motor is reversible so that the screw may be rotated in either direction to advance or retract the push rod.

In order to electrically operate the motor 260, a motor control 268, illustrated schematically in FIG. 10, is provided. Complete control of the motor is provided through both the microprocessor 110 previously referred to and the motor control. The motor control receives an input from the microprocessor 110 and supplies a direct current output through line 269 to the motor.

In order to properly control the movement of the push rod, the motor control and microprocessor receive input from two sources. The first of these sources is the photocell 342 which supplies a signal along line 343 to the microprocessor when the passage in the guide bushing is occupied by the fuel pellets or the push rod.

The second source of input is an encoder 264 connected to the end of the screw 224 so as to rotate in direct response to rotation of the screw. The encoder is a device well known to those skilled in the art which emits a predetermined number of electrical pulses per revolution of the encoder and therefore of the screw. The electrical pulses emitted by the encoder during rotation of the screw are transmitted by line 265 to the microprocessor 110. The microprocessor counts the electrical pulses received from the encoder. Since each revolution of the screw moves the push rod a fixed amount, the number of pulses counted is a direct function of the distance traversed by the push rod. The number of electrical pulses received from the encoder is transformed by the microprocessor into a distance measurement which is displayed on a digital readout 112. This readout appears on the screen 109 (shown in FIG. 1) which is mounted on the control panel 108 so as to be readily viewed by the operator.

In addition, the microprocessor is programmed to automatically command the motor control 268 to reverse the current supplied to the motor when the push rod has entered the fuel rod and the number of pulses totals a predetermined amount. Reversing the current reverses the direction of movement of the push rod so as to retract the push rod from the fuel rod.

In order to calculate the length of the row of fuel pellets being inserted, the photocell 342 detects the beginning of the row of fuel pellets and transmits a corresponding electrical signal to the microprocessor 110. The microprocessor, upon receiving this signal, begins counting the number of pulses emitted by the encoder 264. In order to sense the end of the segment of pellets being loaded into the fuel rod, the push rod 220 is constructed with a transverse hole 267 positioned a predetermined distance from the end thereof. The transverse hole is aligned so as to allow the re-establishment of the path of light from the light source 340 to the photocell 342. Re-establishment of the light path causes the photocell 342 to transmit a signal to the microprocessor causing the microprocessor to terminate its counting of electrical pulses from the encoder. The microprocessor totals the number of electrical pulses received from the encoder, translates this quantity into distance, subtracts the predetermined distance from the end of the push rod to the transverse hole 267 and thus calculates the length of the row of fuel pellets actually being inserted into the fuel rod. This length is displayed on the digital readout 112 mounted on the control panel to be viewed by the operator.

In the construction of fuel rods, it is necessary that the assembled fuel pellets terminate at a specific point within the fuel rod. The end of the fuel rod is closed by an end cap and a spring is inserted between the end cap and the fuel pellets in the final assembly. While the fuel pellets are constructed of a relatively precise length and shape there may be slight variations in both. Since a large number of pellets are assembled in each fuel rod, the cumulative variation in length may be significant. In order to insure that despite any variation in length of the individual pellets, the ultimate total length of the row of fuel pellets is within prescribed narrow limits, a measurement is made of the length of fuel rod remaining unoccupied after the next-to-the-last segment has been inserted. From this information the microprocessor calculates a final segment length which, when inserted, will bring the end point of the assembled fuel pellets within the fuel rod to the specific end point desired.

Referring to FIGS. 5 and 10, the particular arrangement for determining the length of the final segment will be described. The push rod is advanced through the guide bushing into the fuel rod. As the end of the push rod enters the passageway 322 in the guide bushing, the transverse hole 267 in the push rod permits light from the light source 340 to reach the photocell 342. Energization of the photocell causes a signal to be transmitted on line 343 to the microprocessor instructing it to remember the pulse count corresponding to the photocell signal. The push rod continues until it engages the row of fuel pellets previously loaded. The resulting limitation on movement of the push rod causes a cessation in the pulses emitted by the encoder. This is sensed by the microprocessor which commands the motor control 268 to reverse the movement of the push rod until it reaches its retracted position. The microprocessor counts the total number of electrical pulses received from the encoder, subtracts the pulse count corresponding to the photocell signal and translates this into distance. The microprocessor then adds the predetermined distance between the end of the push rod and the transverse hole 267 in the push rod, subtracts the distance between the photocell and the circular lip 329 in the passageway in the guide bushing abutting the end of the fuel rod and arrives at a calculated length of fuel rod remaining unoccupied by fuel pellets. The microprocessor is programmed with the length of fuel rod which must be unoccupied by fuel pellets after the fuel rod is fully loaded. It subtracts this program data from the total length of fuel rod remaining unoccupied before the last segment is inserted, and calculates the required length of the last segment to be assembled by the operator. This information is displayed on the digital readout 112 on the control panel 108, and the appropriate segment length indicator light 120 is illuminated.

Figure 13:
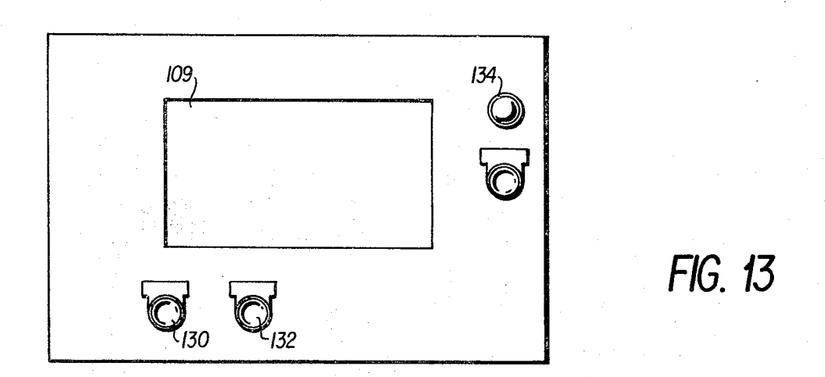
FIG. 13 is an enlarged elevation view of a control block taken from the front surface of the fuel rod loading apparatus shown in FIG. 1.

It is also desirable that certain segments of the row of fuel pellets be placed in specific regions along the length of the fuel rod. In particular, it is very important that certain critical segments containing a specific uranium enrichment and gadolinium oxide composition be positioned properly in order to promote reactor shut-down. The push rod is of sufficient length to engage the end pellet of the previously loaded segments before the critical segments are inserted. Therefore, the procedure as just described to calculate the region unoccupied by fuel pellets is employed to ascertain that the critical segments occupy the correct region within the fuel rod. To initiate the procedure the microprocessor commands the push rod to completely insert the previously loaded fuel pellets. The length of fuel rod remaining unoccupied by fuel pellets is determined, and this information is compared by the microprocessor to the programmed starting point of the critical segment. In the event that the starting point of the critical segment does not fall within certain narrow limits this condition is displayed on the control board to the operator and further loading of that fuel rod is terminated. After the critical segment is inserted, the microprocessor again causes the push rod to be advanced until it engages the end pellet, and the microprocessor determines the distance unoccupied by fuel pellets. Again, the end point of the critical segment is compared to the programmed information, and if the end point does not fall within certain narrow limits, the loading of the fuel rod is terminated, and an alarm 134 on the control panel shown in FIG. 13 is illuminated.

Referring now to FIGS. 11 and 12, the rod carousel 400 is provided for the purpose of holding the fuel rods and for positioning each fuel rod, in turn, in alignment with the guide bushing at the appropriate stage in the loading sequence. The carousel includes a plurality of circular frames 404 for supporting fuel rods. The frames are mounted on a central hub 406 and extend radially outward. Each frame includes a plurality of circumferentially spaced recesses 405 for receiving fuel rods. In order to retain the fuel rods in the recesses, a plurality of pivoted clamps 408 are provided that pivot outwardly to allow insertion of the fuel rods in the recesses and are clamped tightly around the circumference of the circular frame to hold the fuel rods in place during loading operations. In the specific embodiment, the circular frame contains 50 recesses. For convenience of description the recess containing the first fuel rod to be loaded is numbered 500 in FIG. 12, the next recess is numbered 501 and the last recess is designated 550.

The carousel control mechanism, which in the operational model is a simple drive 410, is provided for the purpose of rotating the carousel. The drive is controlled by a signal supplied from the microprocessor which causes the drive 410 to rotate the carousel at the proper time and by the proper amount to present the next fuel rod to a position in alignment with the guide bushing passageway 322. An encoder 420 mounted on the carousel emits a fixed number of electrical pulses per revolution of the carousel. These pulses are transmitted electrically to the microprocessor. The microprocessor counts the electrical pulses to determine the angle through which the carousel has rotated and the relative circumferential position of the carousel. While the carousel of this embodiment is indicated as having fifty recesses, it is not necessary that fuel rods be loaded in all the recesses in all cases. Only the number of fuel rods required for the particular loading operation are placed in successive recesses in the carousel. The microprocessor automatically commands the carousel control to rotate so as to present only those recesses which contain fuel rods. In order to enable the microprocessor to keep track of which fuel rod is currently in position to be loaded, the first fuel rod, designated 500 in FIG. 12, is positioned in alignment with the guide bushing passageway at the beginning of the loading operation. Further rotation of the rod carousel is then controlled by the microprocessor.

OPERATION

In the preferred method of operation, a first type of fuel pellet is assembled in segments and loaded into each of the fuel rods consecutively until all of the fuel rods have been loaded with the first segment consisting of the first type of fuel. After all of the first segments have been loaded, the second segments are assembled and loaded into each of the fuel rods consecutively. This same sequence of operations is repeated for all of the remaining segments until all of the fuel rods are completely loaded. This method of operation makes it possible to present to the operator one type of fuel only at any given time. The purpose of this method of operation is to prevent the possibility of the operator mixing different types of fuel pellets in a single fuel segment resulting in an improperly loaded fuel rod.

When fuel pellets of the first type are presented in a tray 102 on the worktable 106, the microprocessor 110 designates the exact segment length to be assembled on the digital readout 112 on the control panel 108. The microprocessor is also programmed to illuminate one of the segment length indicator lights 120. This gives the operator an indication of the general region of the left end point for the segment currently being assembled. Mounted along the worktable is a scale 122 marked off in specific increments, which provide the operator with a specific length designation for the left end point and a plus or minus 1/4 inch tolerance. The operator places the fuel pellets in a row on the split "V" trough 202 until the segment length extends from the far righthand side of the split "V" trough to the end point corresponding to the segment length designated by the digital readout and specifically indicated by an appropriately chosen increment on the scale 122.

The machine is now ready to begin the automatic loading operation. To begin the procedure, the operator pushes a "start load" switch 130 (shown in FIG. 13) on the control panel 108. This allows the microprocessor 110 to position the push rod in a position for the segment to be loaded and causes the carousel drive 410 to rotate the carousel 400 so as to index the fuel rod in the recess designated 500 into alignment with the guide bushing 320.

When a complete segment is assembled, the operator pushes the "weigh" button 132 on the control panel 108. The shuttle posts 210 begin moving vertically upward carrying the shuttle supports 211 and the shuttle 204 to receive the row of fuel pellets. As the shuttle begins its upward movement, first, the cover cam 234 and second, the push rod cam 212 engage their corresponding cam surfaces to swing the cover 230 and the push rod 220 out of the path to be traversed by the shuttle during its vertical movement. When the shuttle arrives at a position directly beneath and adjacent the split "V" trough 202, the split "V" cams 290 engage the split "V" cam surfaces 248 on each side of the split "V" trough 202 causing the two sides of the split "V" to open. As the two sides of the split "V" open, the gap between the two sides increases to a distance greater than the diameter of the fuel pellets causing the fuel pellets to drop down onto the shuttle. After the shuttle posts have risen to the full extent of their vertical movement, the scale posts 211 continue to rise to a slightly higher position lifting the shuttle off the shuttle posts so that the shuttle is completely supported by the scale posts unhindered by the shuttle posts or any force on the cams attached to the support table 213. The scales 252 are then activated to electronically weigh the shuttle and the row of fuel pellets currently held by the shuttle. This information is electronically transmitted to the microprocessor 110 which subtracts the weight of the shuttle and the scale posts so as to arrive at the weight of the fuel pellets alone. The calculated weight is displayed on the control panel 108.

After the weighing has been completed, the scale posts drop vertically until the shuttle rests on both the scale posts and the shuttle supports 211, at which time both the scale posts and the shuttle posts drop at the same rate of speed to their lowest position as indicated by the solid lines in FIG. 2. As the split "V" cams disengage the split "V" surfaces the springs 293 extend under tension so as to force the two sides of the split "V" together to the closed position illustrated by solid lines in FIG. 2.

As the shuttle approaches its lowest position, first the push rod cam and second the cover cam disengage their corresponding cam surfaces causing the push rod and then the cover to swing back into place over the shuttle as indicated by positions 220 and 230, respectively, shown in solid lines in FIG. 2.

As the shuttle posts and scale posts drop to their lowest position, the shuttle bottom comes to rest on the shuttle rollers 251 and the shuttle posts and scale posts disengage the shuttle. When the shuttle is supported by the shuttle rollers alone, the fuel pellets resting on the shuttle and the push rod positioned behind the fuel pellets are in alignment with the trough 303 in the guide bushing forebody, the passageway 322 in the guide bushing and the inner diameter of the fuel rod.

The guide bushing assembly actuator 310 shown in FIG. 4 now cycles to move the guide bushing assembly longitudinally into engagement with the aligned fuel rod 402 in recess 500 shown in FIG. 12. This is immediately followed by a cycling of the shuttle actuator mechanism 270 to move the shuttle 204 longitudinally along the rollers 251 into engagement with the guide bushing assembly. Tapered pins 306 mounted on the guide bushing forebody 302 serve to automatically align the shuttle 204 with the trough 303 in the guide bushing forebody. This alignment insures a smooth transition of fuel pellets from the shuttle to the guide bushing forebody to prevent chipping or other damage to the fuel pellets during the transfer operation.

The fuel pellet loading machine is now ready to transfer the fuel pellets into the fuel rods. The microprocessor commands the motor control 268 to energize the motor 260 to rotate the screw 224 thereby moving the push rod 220 along the trough of the shuttle 204. If the fuel pellets should tend to rise up while they are pushed along the shuttle, the shuttle cover forms a confined area along the shuttle which prevents the pellets from rising sufficiently to cause jamming or to cause the pellets to be forced out of the shuttle. When the fuel pellets enter the guide bushing forebody, the proper alignment of the shuttle with the trough and the guide bushing forebody insured by the tapered pins 306 promotes a smooth transition of fuel pellets from the shuttle to the guide bushing forebody.

As the pellets are transferred through the passageway 322 in the guide bushing, the microprocessor 110 automatically determines the length of the row of fuel pellets currently being loaded in the manner previously described. The information is stored, enabling the microprocessor to later calculate the total length of the fuel pellets inserted in each rod.

When loading the pellets, the push rod is advanced so as to push the fuel pellets into the fuel rod 402 in recess 500 currently in engagement with the guide bushing. As the row of fuel pellets is inserted into the fuel rod, the push rod continues to advance until a predetermined number of pulses have been counted by the microprocessor, at which time the microprocessor causes the motor to reverse the direction of rotation of the screw and consequently reverse direction of movement of the push rod. The push rod is retracted from the fuel rod and the guide bushing to a position at the opposite end of the shuttle. The shuttle actuating mechanism 270 cycles to move the shuttle longitudinally so as to disengage the guide bushing assembly 300. The guide bushing assembly actuator mechanism 310 then cycles to disengage the guide bushing assembly from the aligned fuel rod.

The carousel drive 410 automatically rotates the rod carousel 400 to bring the next fuel rod in recess 501 to a position in alignment with the passageway 322 in the guide bushing 320. The operator again assembles the appropriate length of fuel pellets to comprise another segment, and the entire loading process is repeated. When the carousel has fully rotated so that recess 550 is presented in alignment with the passageway in the guide bushing, and all of the fuel rods have been loaded with the type of fuel currently available to the operator, the conveyor system 104 removes the tray 102 holding the first type of fuel. A new tray of the next desired type of fuel pellets is transferred onto the worktable 106, allowing the operator to begin assembling segments consisting of a second type of fuel.

This second type of fuel is now placed on the split "V" trough in the predetermined segment length and the loading operation is repeated in the same steps followed in loading the segments of the first type of fuel. As the segments are inserted in the fuel rods, the apparatus used to measure the segment lengths continues to measure each segment as it is loaded into each fuel rod. The microprocessor may be programmed to calculate the combined length of the segments inserted and compare that length with the programmed length in the rod design.

The remaining segments of fuel pellets are loaded in the same manner until the last segment is to be loaded in all of the fuel rods. At this point in the sequence of operations, it is essential that the last segment of fuel pellets be the correct length such that when the last segment is inserted in the fuel rod the total length of fuel pellets falls within narrow predetermined limits. The calculation of this last segment length may be accomplished by either of two methods. The microprocessor may be programmed to calculate the total length of fuel pellets by adding together all of the segment lengths previously inserted and recorded by the microprocessor. This summation is subtracted from the total length of fuel pellets dictated by the rod design to arrive at a final segment length which is displayed on the digital readout 112 displayed on the control panel.

In the alternative, the last segment length can be determined by the method described earlier in which the push rod 220 is moved longitudinally into the fuel rod so as to fully insert the fuel pellets already loaded in the fuel rod. The microprocessor begins counting the pulses emitted by the encoder 264 when the transverse hole 267 in the push rod passes the photocell 342. The microprocessor terminates the counting of pulses when the direction of movement of the push rod is reversed. The microprocessor then calculates the length of fuel rod remaining unoccupied by fuel pellets, compares this information to the programmed total length of fuel pellets which are to be inserted according to the rod design and calculates the required length of the last segment. This information is displayed to the operator on the control panel and the operator now has the information necessary to assemble the last segment and the loading operations are completed. Those skilled in the art will realize that the function of the photocell and the light source might also be accomplished by a pneumatic switch placed along the passageway in the guide bushing. The pneumatic switch would react to the passing of the fuel pellets or the push rod and would relay a signal to the microprocessor when the transverse hole in the push rod passes the limit switch.

As the apparatus is currently being operated the microprocessor calculates the segment lengths, the last segment length to be inserted and the position within the fuel rod of any critical segments. The loading apparatus, as described, measures the fuel pellet segment weights. If any of these measured quantities do not fall within certain predetermined parameters, the microprocessor interrupts the loading of that fuel rod, and provides an appropriate signal to inform the operator.

It will be apparent that modifications and variations are possible in light of the above teachings. It therefore is to be understood that, within the scope of the appended claims, the invention may be practiced by equipment other than that specifically described.

We claim:

1. An apparatus for loading fuel rods with nuclear fuel pellets comprising:
   (a) an elongated member for receiving a plurality of fuel pellets arranged in a row;
   (b) a fuel rod indexer for supporting a plurality of fuel rods;
   (c) means for moving said fuel rod indexer to sequentially present each of said fuel rods in position for receiving said row of fuel pellets;
   (d) means to transfer said row of fuel pellets from said elongated member into said fuel rod including;
   (e) a shuttle positioned below said elongated member; and
   (f) means for moving said shuttle to a receiving position for receiving said fuel pellets from said elongated member and to a loading position wherein said pellets are disposed in alignment with one of said fuel rods.

2. The apparatus recited in claim 1, wherein said fuel rod indexer comprises:
   (a) a carousel having a plurality of circumferentially spaced recesses for receiving a plurality of fuel rods;
   (b) means mounted on said carousel to retain said fuel rods in said recesses;
   (c) means to rotate said carousel; and
   (d) a carousel control for controlling rotation of said carousel to sequentially present each fuel rod in a position in alignment with said row of fuel pellets.

3. The apparatus recited in claim 1, wherein said means to transfer said row of fuel pellets includes:
   (a) a push rod positioned in alignment with said row of fuel pellets;
   (b) a lead screw for effecting linear movement of said push rod;
   (c) a reversible motor to rotate said screw; and
   (d) a motor control to energize said motor for advancing said push rod to insert said fuel pellets into said fuel rod and to reverse said motor after insertion of said fuel pellets for retracting said push rod from said fuel rod.

4. The apparatus recited in claim 1, wherein said elongated member comprises:
   (a) a split "V" trough comprising two inclined members pivotally mounted for movement between a first position for receiving said fuel pellets and a second position; and
   (b) said apparatus further includes means to pivot said inclined members to said second position to cause said fuel pellets to drop onto said shuttle.

5. The apparatus recited in claim 4, and further including:
   (a) a plurality of shuttle rollers for supporting said shuttle in said loading position;
   (b) shuttle posts mounted below said shuttle; and
   (c) a mechanism to move said shuttle posts to engage and move said shuttle between its loading and receiving positions.

6. The apparatus of claim 4, and further including:
   (a) shuttle posts mounted below said shuttle;
   (b) a mechanism to move said shuttle posts to engage and move said shuttle between its loading and receiving positions;
   (c) split "V" cams mounted on said shuttle posts for movement therewith;
   (d) said split "V" cams positioned to engage and activate said means to pivot said inclined members to their second position when said shuttle moves to its receiving position; and
   (e) means to pivot said inclined members back to said first position when said shuttle moves to its loading position.

7. The apparatus recited in claim 1, and further including an electronic weighing device cooperating with said shuttle comprising:
   (a) a base;
   (b) load cells mounted on said base;
   (c) means for supporting said shuttle and said fuel pellets therein on said load cells whereby said load cells sense the weight of said shuttle and said pellets;
   (d) said load cells developing a signal representative of the weight of said fuel pellets and said shuttle; and
   (e) means for receiving said signal from said load cells and calculating the weight of said fuel pellets.

8. The apparatus recited in claim 1, and further including a guide bushing interposed between said fuel rod indexer and said row of fuel pellets to assist the transfer of said fuel pellets into the fuel rod presented by said fuel rod indexer; said guide bushing having a longitudinal passageway for passage of said fuel pellets therethrough, and wherein said shuttle in its second position disposes said pellets in alignment with said passageway.

9. The apparatus recited in claim 8, and further including:
   (a) means for effecting relative movement of said guide bushing and said fuel rod; and
   (b) an opening in said passageway having continuously tapered sides for receiving said fuel rods and centering said fuel rods relative to said passageway.

10. The apparatus recited in claim 8, and further including a guide bushing actuator to move said guide bushing longitudinally to engage the fuel rod presented by said fuel rod indexer.

11. The apparatus recited in claim 10, and further including:
    (a) a guide bushing assembly including said guide bushing and a guide bushing forebody; and (b) a shuttle actuator to move said shuttle longitudinally into engagement with said guide bushing forebody when said shuttle occupies its loading position.

12. The apparatus recited in claim 1, and further including a guide bushing interposed between said fuel rod indexer and said row of fuel pellets to assist the transfer of said fuel pellets into the fuel rod presented by said fuel rod indexer; said guide bushing having a longitudinal passageway for passage of said fuel pellets therethrough.

13. The apparatus recited in claim 12, wherein said guide bushing further includes passages communicating with said passageway for directing a gas stream into said passageway and a vacuum outlet communicating with said passageway to exhaust said gas stream and remove dust from said pellets and said passageway.

14. The apparatus recited in claim 12, wherein said means to transfer said row of fuel pellets includes:
   (a) a push rod positioned in alignment with said row of fuel pellets;
   (b) a lead screw for effecting linear movement of said push rod;
   (c) a reversible motor to rotate said screw; and
   (d) a motor control to energize said motor for advancing said push rod to insert said fuel pellets into said fuel rod and to reverse said motor after insertion of said fuel pellets for retracting said push rod from said fuel rod.

15. The apparatus recited in claim 14, and further including means for determining the length of the row of fuel pellets being inserted comprising:
   (a) an encoder responsive to rotation of said screw for generating a predetermined number of pulses per revolution of said screw;
   (b) a light source positioned to emit light along a light path across the passageway in said guide bushing;
   (c) a photocell positioned to receive light from said light source;
   (d) means responsive to interruption of said light path by the pellets being pushed through said passageway to initiate counting said pulses from said encoder;
   (e) said push rod having a hole extending transversely therethrough at a predetermined distance from the end of said push rod for re-establishing said light path to terminate counting of said pulses; and
   (f) means for determining from the number of pulses the amount moved by said push rod between interruption and re-establishment of said light path and for subtracting said predetermined distance to determine the length of said row of fuel pellets being inserted.

16. The apparatus recited in claim 14, and further including means for determining the length of said row of fuel pellets required to completely load said fuel rod, said means including:
   (a) an encoder responsive to rotation of said screw for generating a predetermined number of pulses per revolution of said screw;
   (b) means for causing said push rod to move forward into said fuel rod until forward movement is blocked by previously loaded fuel pellets;
   (c) a light source positioned to emit light along a path across the passageway of said guide bushing;
   (d) a photocell positioned to receive light from said light source;
   (e) said photocell developing a signal to initiate the counting of said pulses upon the blocking of said light path when said push rod advances past said light source;
   (f) means to terminate counting said pulses when forward movement of said push rod is blocked by previously loaded pellets;
   (g) means responsive to blocking of said forward movement of said push rod to command said motor control to reverse the movement of said push rod; and
   (h) means for determining from the number of pulses counted the length of the row of fuel pellets required to complete the loading of said fuel rod.

17. The apparatus recited in claim 3, and further including:
   (a) an encoder responsive to rotation of said screw for generating a predetermined number of pulses per revolution of said screw;
   (b) means to count said pulses; and
   (c) said last-named means being dependent upon receipt of a predetermined total number of pulses from said encoder for effecting reversal of said motor after said fuel pellets have been inserted into said fuel rod.

18. The apparatus recited in claim 8, wherein said means to transfer said fuel pellets include:
   (a) a push rod positioned in alignment with said row of fuel pellets;
   (b) a lead screw for effecting linear movement of said push rod;
   (c) a reversible motor to rotate said screw; and
   (d) a motor control to energize said motor for advancing said push rod to insert said fuel pellets into said fuel rod and to reverse said motor after insertion of said fuel pellets for retracting said push rod from said fuel rod.

19. The apparatus recited in claim 18, wherein said push rod is pivotally mounted for movement between a first position overlying said shuttle and a second position clear of said shuttle; and
   (a) shuttle posts for supporting said shuttle during movement between its loading and receiving positions;
   (b) a push rod cam mounted on said shuttle posts for movement therewith;
   (c) means for effecting upward and downward movement of said shuttle posts to move said shuttle between its loading and receiving position; and
   (d) a push rod mechanism engageable by said push rod cam during movement of said shuttle posts for pivoting said push rod to its second position to permit movement of said shuttle.

20. The apparatus recited in claim 19, and further including:
   (a) a cover pivotally mounted for movement between a first position wherein said cover is positioned over said shuttle for confining fuel pellets therein and a second position clear of said shuttle;
   (b) a cover cam mounted on said shuttle posts for movement therewith; and
   (c) a cover mechanism engageable by said cover cam during movement of said shuttle posts for pivoting said cover to its second position to permit movement of said shuttle.

21. An apparatus for loading fuel rods with nuclear fuel pellets comprising:

(a) a split "V" trough comprising two inclined members pivotally mounted for movement between a first position for receiving a plurality of fuel pellets arranged in a row and a second position;

(b) a fuel rod indexer comprising a carousel having a plurality of circumferentially spaced recesses for receiving and supporting a plurality of fuel rods, and means to rotate said carousel to sequentially present each fuel rod to a loading position;

(c) a guide bushing in alignment with the fuel rod presented for loading by said carousel to assist the transfer of said fuel pellets into said fuel rod, said guide bushing containing a longitudinal passageway for passage of said fuel pellets therethrough;

(d) a shuttle positioned below said split "V" trough;

(e) means for moving said shuttle to a receiving position for receiving said fuel pellets from said split "V" trough and to a loading position wherein said fuel pellets are in alignment with said passageway in said guide bushing;

(f) means to pivot said inclined members to said second position to cause said fuel pellets to drop onto said shuttle;

(g) a guide bushing actuator to move said guide bushing longitudinally to engage said fuel rod presented by said fuel rod indexer;

(h) a guide bushing assembly including said guide bushing and a guide bushing forebody, and a shuttle actuator to move said shuttle longitudinally into engagement with said guide bushing forebody when said shuttle occupies its loading position;

(i) means to transfer said fuel pellets from said shuttle into said fuel rods comprising:
(i) a push rod positioned in alignment with said passageway in said guide bushing;
(ii) a screw for effecting movement of said push rod;
(iii) a reversible motor to rotate said screw;
(iv) a motor control to energize said motor for advancing said push rod to push said fuel pellets into said fuel rod and to reverse said motor after insertion of said fuel pellets for retracting said push rod from said fuel rod;

(j) an encoder responsive to rotation of said screw for generating a predetermined number of pulses per revolution of said screw;

(k) means to determine the length of the row of fuel pellets being inserted comprising:
(i) a light source positioned to emit light along a light path across the passageway in said guide bushing;
(ii) a photocell positioned to receive light from said light source;
(iii) means responsive to interruption of said light path by fuel pellets being pushed through said passageway to initiate counting of pulses from said encoder;
(iv) said push rod having a hole extending transversely therethrough at a predetermined distance from the end of said push rod for re-establishment of said light path to terminate counting of said pulses;
(v) means for determining from the number of pulses counted the amount moved by said push rod between interruption and re-establishment of said light path and for subtracting said predetermined distance to determine the length of said row of fuel pellets being inserted;

(l) means for determining the length of the row of fuel pellets required to completely load said fuel rod, said means including;
(i) means for causing said push rod to move forward into said fuel rod until forward movement is blocked by previously loaded fuel pellets;
(ii) said photocell developing a signal to initiate counting of said pulses from said encoder upon establishment of said path when said transverse hole in said push rod passes said light source;
(iii) means to terminate counting said pulses when forward movement of said push rod is blocked by previously loaded pellets;
(iv) means responsive to blocking of said forward movement of said push rod to command said motor control to reverse the movement of said push rod; and
(v) means for determining from the number of pellets counted the length of the row of fuel pellets required to complete the loading of said fuel rod.

22. The apparatus recited in claim 21, and further including:
(a) said push rod pivotally mounted for movement between a first position overlying said shuttle and a second position clear of said shuttle;
(b) shuttle posts for supporting said shuttle during movement between its loading and receiving positions;
(c) a push rod cam mounted on said shuttle posts for movement therewith;
(d) means for effecting upward and downward movement of said shuttle posts to move said shuttle between its loading and receiving position; and
(e) a push rod mechanism engageable by said push rod cam during movement of said shuttle posts for pivoting said push rod to its second position to permit movement of said shuttle.

23. The apparatus recited in claim 22, and further including:
(a) split "V" cams mounted on said shuttle posts for movement therewith;
(b) said split "V" cams positioned to engage and activate said means to pivot said inclined members to their second position when said shuttle moves to its receiving position; and
(c) means to pivot said inclined members back to said first position when said shuttle moves to its loading position.

24. The apparatus recited in claim 22, and further including:
(a) a cover pivotally mounted for movement between a first position wherein said cover is positioned over said shuttle for confining fuel pellets therein and a second position clear of said shuttle;
(b) a cover cam mounted on said shuttle posts for movement therewith; and
(c) a cover mechanism engageable by said cover cam during movement of said shuttle posts for pivoting said cover to its second position to permit movement of said shuttle.

* * * * *